(12) United States Patent
Xu et al.

(10) Patent No.: US 8,424,932 B2
(45) Date of Patent: Apr. 23, 2013

(54) LOCKING ASSEMBLY AND ELECTRONIC ENCLOSURE USING SAME

(75) Inventors: Chang-Zheng Xu, Shenzhen (CN); Yang-Ming Lin, Shenzhen (CN); Hsuan-Tsung Chen, Taipei Hsien (TW); Guang-Yao Lee, Taipei Hsien (TW)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 497 days.

(21) Appl. No.: 12/688,900

(22) Filed: Jan. 17, 2010

(65) Prior Publication Data

US 2011/0115347 A1    May 19, 2011

(30) Foreign Application Priority Data

Nov. 18, 2009    (CN) .......................... 2009 1 0309919

(51) Int. Cl.
*E05C 1/08*    (2006.01)
*E05C 1/02*    (2006.01)

(52) U.S. Cl.
USPC ..... 292/163; 292/137; 292/164; 292/DIG. 63

(58) Field of Classification Search .................. 361/681, 361/727, 679.27, 697.58, 726; 292/156, 292/128, 102, 106, 108, 175, 146, 150, 153, 292/137, 163, 164, 177, 179, DIG. 23, DIG. 63
See application file for complete search history.

(56) References Cited

U.S. PATENT DOCUMENTS

| | | | | |
|---|---|---|---|---|
| 5,168,429 A * | 12/1992 | Hosoi | ....................... | 361/679.09 |
| 5,198,966 A * | 3/1993 | Kobayashi et al. | ...... | 361/679.09 |
| 5,379,182 A * | 1/1995 | Fujimori et al. | ......... | 361/679.27 |
| 5,465,191 A * | 11/1995 | Nomura et al. | .......... | 361/679.27 |
| 5,497,296 A * | 3/1996 | Satou et al. | .............. | 361/679.09 |
| 5,673,949 A * | 10/1997 | Mader et al. | ................... | 292/164 |
| 6,093,039 A * | 7/2000 | Lord | ............................. | 439/155 |
| 6,108,196 A * | 8/2000 | Jung | ........................ | 361/679.55 |
| 6,115,239 A * | 9/2000 | Kim | ........................ | 361/679.57 |
| 6,296,334 B1 * | 10/2001 | Liao | ............................ | 312/223.2 |
| 6,517,129 B1 * | 2/2003 | Chien et al. | ................ | 292/251.5 |
| 6,535,380 B1 * | 3/2003 | Lee et al. | .................. | 361/679.27 |
| 6,623,049 B2 * | 9/2003 | Shreeve et al. | .................. | 292/19 |
| 6,704,194 B2 * | 3/2004 | Koo | ........................ | 361/679.27 |
| 6,935,661 B1 * | 8/2005 | Farnsworth et al. | .......... | 292/162 |
| 7,088,588 B2 * | 8/2006 | Lee | ................ | 361/725 |
| 7,164,578 B2 * | 1/2007 | Wang et al. | .............. | 361/679.08 |
| 7,370,218 B2 * | 5/2008 | Lee | ................ | 713/320 |
| 7,374,438 B2 * | 5/2008 | Jiang et al. | .................... | 439/135 |
| 7,407,202 B2 * | 8/2008 | Ye et al. | ..................... | 292/251.5 |

(Continued)

*Primary Examiner* — Carlos Lugo

(74) *Attorney, Agent, or Firm* — Altis Law Group, Inc.

(57) ABSTRACT

An enclosure includes a base, a cover mounted on the base, and two locking members assembled on the cover. A plurality of supporting recesses and two supporting portions are defined in the base. A plurality of barbs are formed on the cover to match with the supporting recesses. The locking members each include a securing portion movably assembled on a bottom of the cover, an operating portion mounted on a top of the cover and extending through the cover and connected to the securing portion, and a flexible member abutting against both the securing portion and the cover. The securing portion is engaged with a corresponding supporting portion to secure the cover on the base. The securing portion can be operated to disengage from the supporting portion to remove the cover from the base.

14 Claims, 7 Drawing Sheets

U.S. PATENT DOCUMENTS

| | | | | |
|---|---|---|---|---|
| 7,417,851 B2 * | 8/2008 | Chen et al. | ............... | 361/679.27 |
| 7,513,542 B2 * | 4/2009 | Schumm | ....................... | 292/163 |
| 7,841,632 B2 * | 11/2010 | Tracy et al. | .................... | 292/163 |
| 7,876,567 B2 * | 1/2011 | Wang | ............................ | 361/726 |
| 2003/0011972 A1 * | 1/2003 | Koo | ............................... | 361/681 |
| 2003/0147207 A1 * | 8/2003 | Syring et al. | ................... | 361/683 |
| 2006/0007649 A1 * | 1/2006 | Yang | ............................. | 361/683 |
| 2006/0170223 A1 * | 8/2006 | Homer et al. | ................. | 292/102 |

\* cited by examiner

LOCKING ASSEMBLY AND ELECTRONIC ENCLOSURE USING SAME

BACKGROUND

1. Technical Field

The present disclosure relates to a locking assembly, and particularly to a locking assembly for an electronic enclosure.

2. Description of Related Art

Usually, an enclosure of an electronic device such as a computer housing or a monitor, includes a base and a cover covering the base. Users can assemble electronic elements such as a main board onto the base and apply the cover to seal the enclosure, protecting the electronic elements.

Conventionally, a plurality of screws are applied to lock the cover onto the base. However, such means needs additional tools such as screwdrivers during assembly, which is time consuming and troublesome.

Therefore, there is room for improvement within the art.

DETAILED DESCRIPTION

Figure 1:
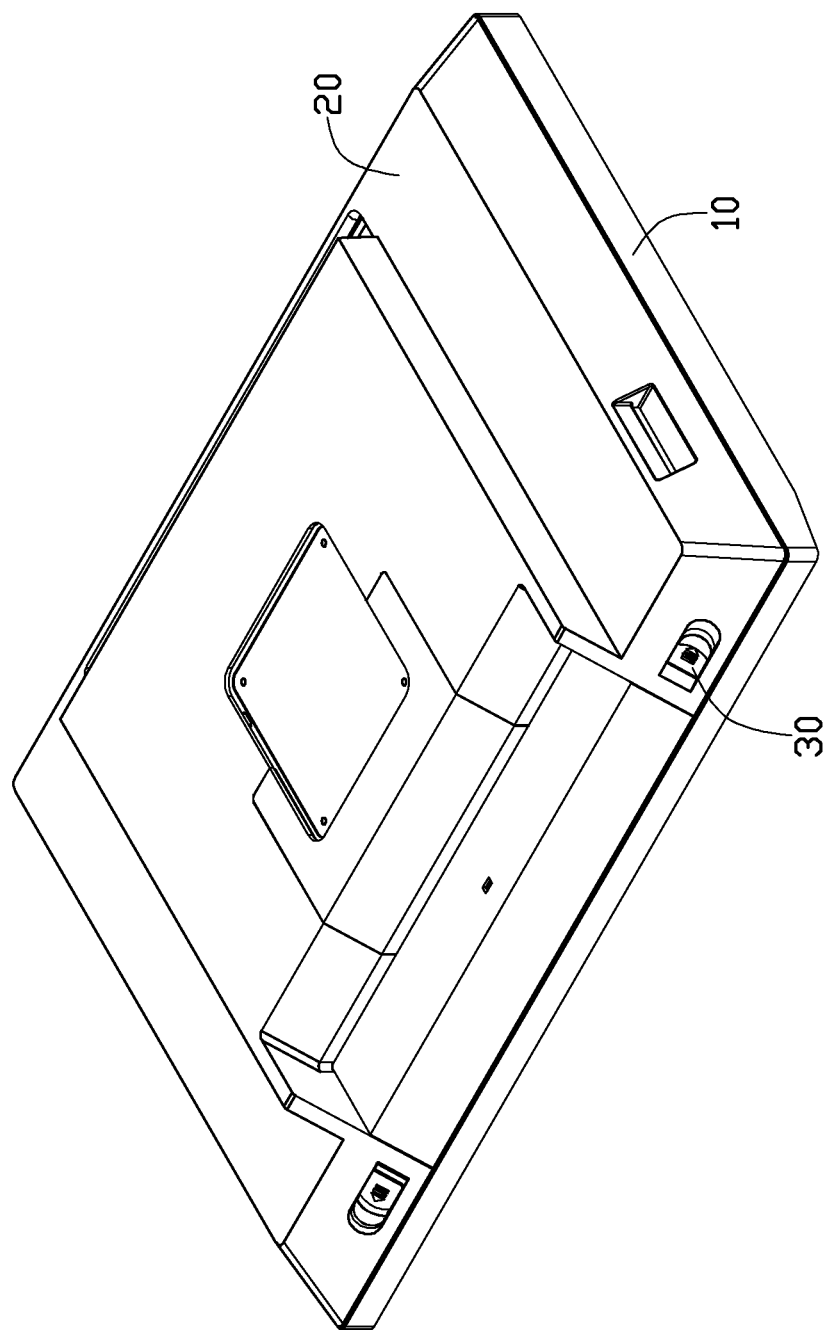
FIG. 1 is an isometric view of a locking assembly in accordance with an exemplary embodiment of the disclosure applied in a monitor enclosure.

The locking assembly for an electronic enclosure in accordance with an exemplary embodiment of the present disclosure is applied to a monitor enclosure as an example. Understandably, the locking assembly can be used in computer housings or other enclosures of electronic devices.

Referring to FIGS. 1-3, and 6-7, the monitor enclosure comprises a base 10, a cover 20 mounted on the base 10, and two locking members 30 assembled on the cover 20. A plurality of supporting recesses 12 are defined in the base 10, and two supporting portions 13 are formed on the base 10. A plurality of barbs 22 are formed on the cover 20 to match with the supporting recesses 12. The locking members 30 each comprise a securing portion 34 movably assembled on a bottom of the cover 20, an operating portion 36 mounted on a top of the cover 20 and extended through the cover 20 to connect to the securing portion 34, and a flexible member 38 abutting against both the securing portion 34 and the cover 20. The securing portions 34 can be engaging with or disengaging from the supporting portions 13, to lock (shown in FIG. 6) or unlock (shown in FIG. 7) the cover 20 on the base 10, by operating the operating portions 36. There are two locking members 30 and two supporting portions 13 in the present exemplary embodiment, and the locking members 30 and supporting portions 13 are symmetrically set in the front end of the cover 20 and the base 10. It is understood that, the number of locking members 30 can be changed in alternative embodiments, and just one locking member 30 matching with one supporting portion 13 is also capable of locking the cover 20 with the base 10.

Figure 2:
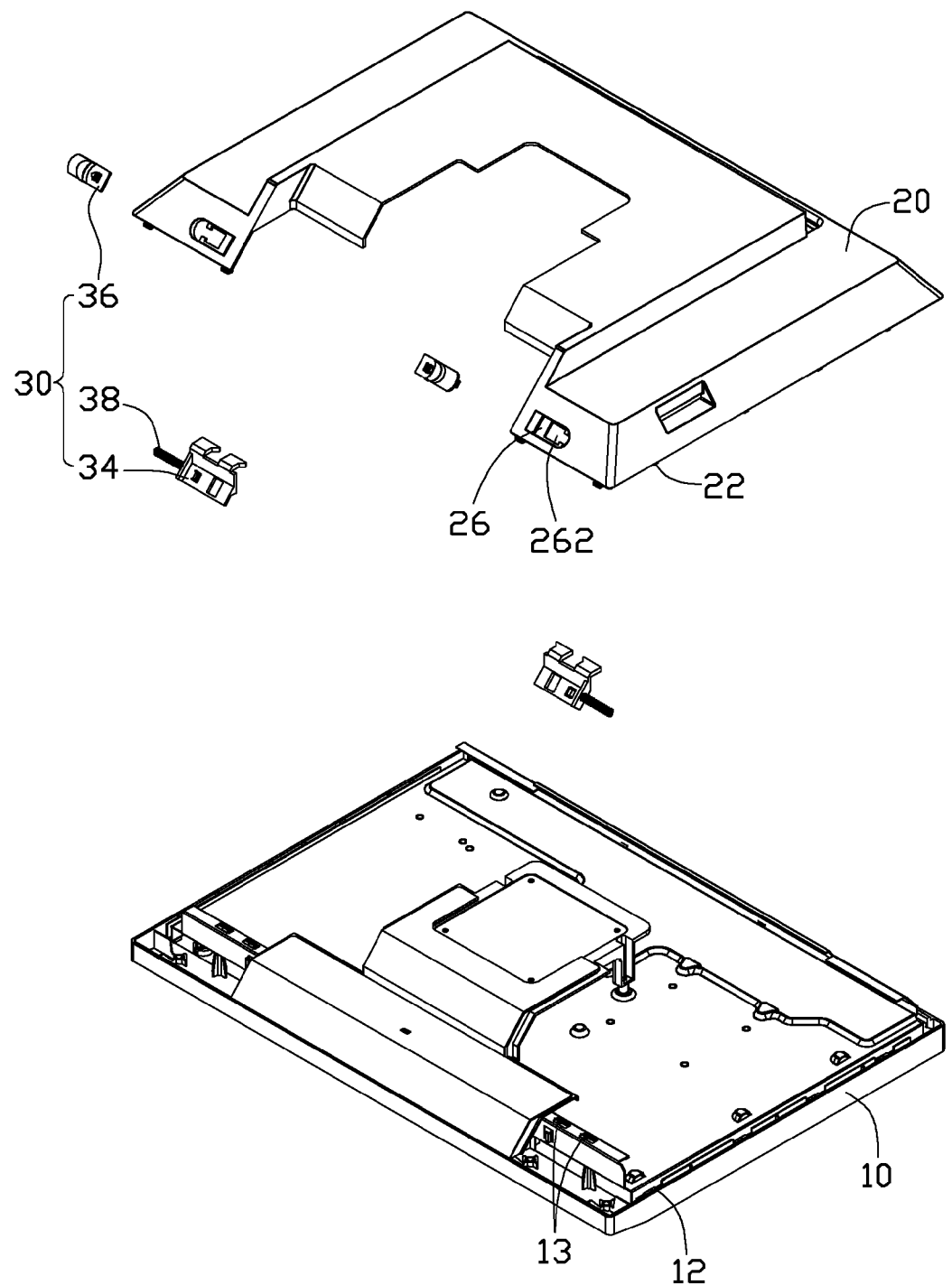
FIG. 2 is an exploded, isometric view of the monitor enclosure of FIG. 1.
Figure 6:
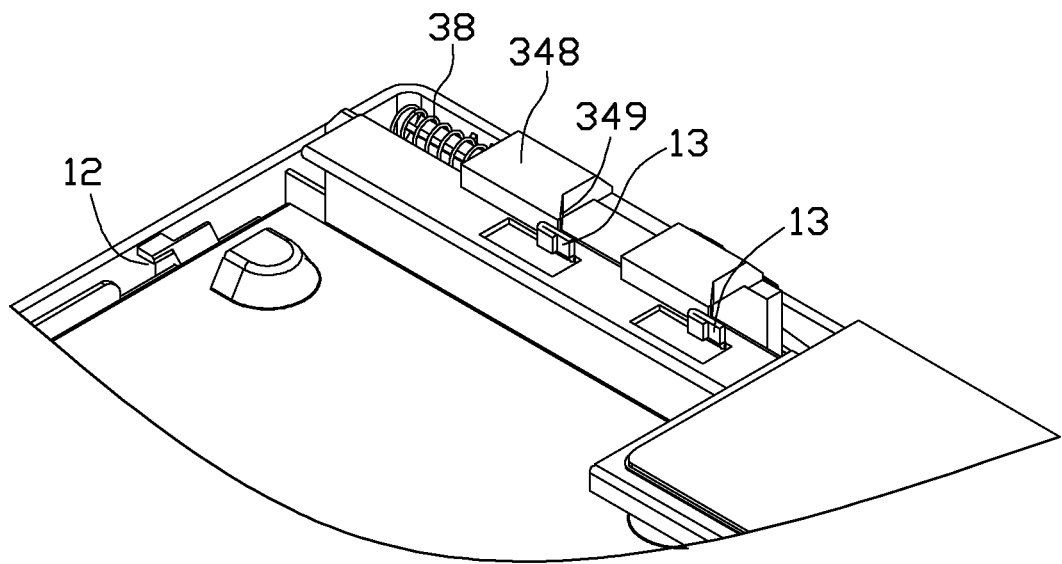
FIG. 6 is an isometric view of the monitor enclosure with the locking member in a locked position, wherein the cover has been removed for clarity.

As shown in FIGS. 2 and 6, a supporting portion 13 extends upwardly from the base 10 corresponding to the position of one locking member 30. In this embodiment, the supporting portion 13 is two spaced baffles 13. The supporting recesses 12 are defined in two lateral sides of the base 10, there are four in each lateral side. The opening direction of the supporting recesses 12 are opposite to (i.e., away from) the supporting portion 13.

Figure 3:
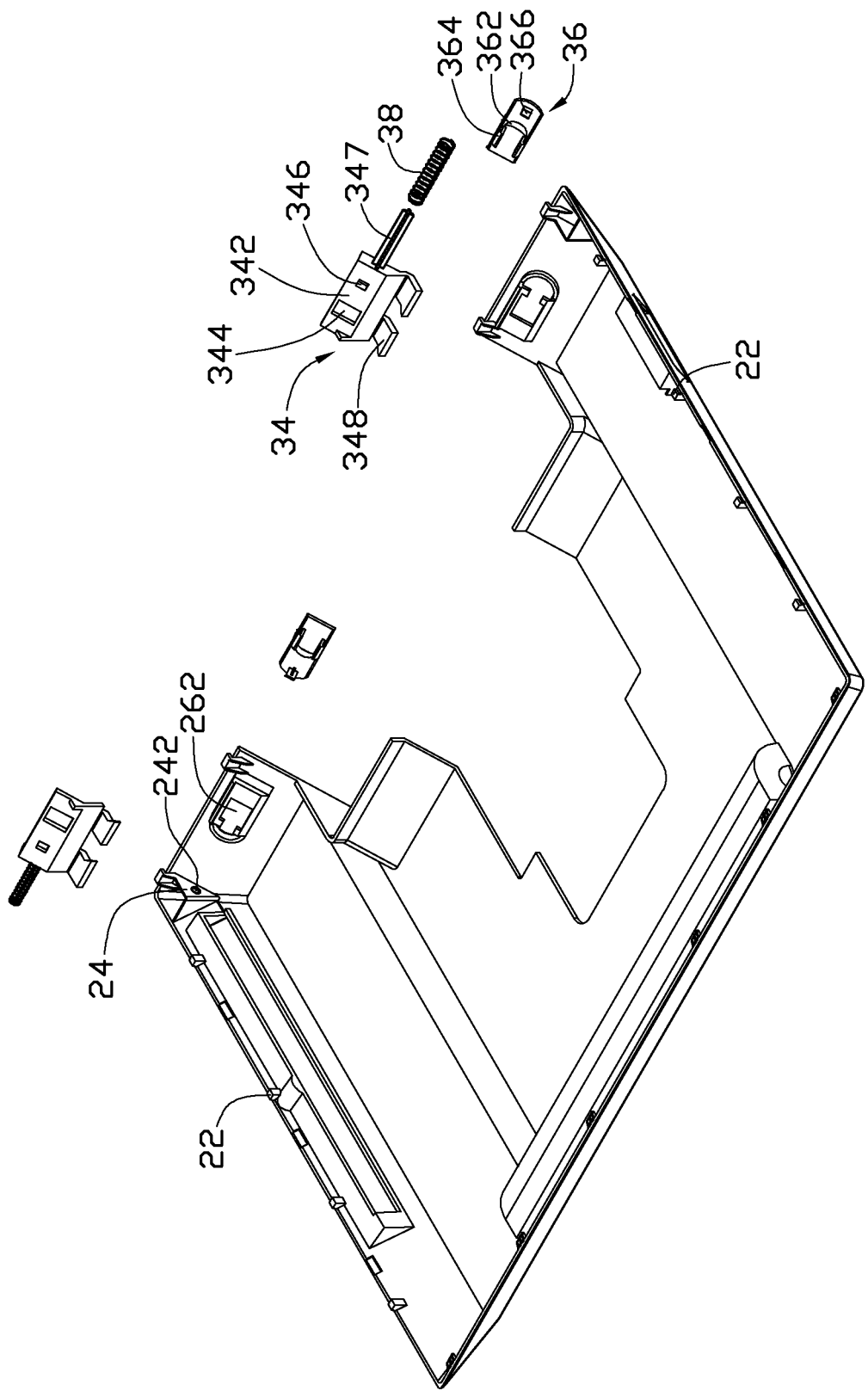
FIG. 3 is an exploded, isometric view of two locking members and a cover of the monitor enclosure in FIG. 2, shown from a different aspect.

Also referring to FIGS. 2 and 3, four of the barbs 22 extend down from each lateral side of the cover 20 for matching with the supporting recesses 12 of the base 10. A restricting wall 24, with a hole 242 defined therein, is formed at the bottom of the cover 20 in each corner of the front end of the cover 20. A concave portion 26 is defined in the front end of the cover 20 at each of two positions corresponding to the positions of the locking members 30. A notch 262 is defined in the concave portion 26.

Figure 4:
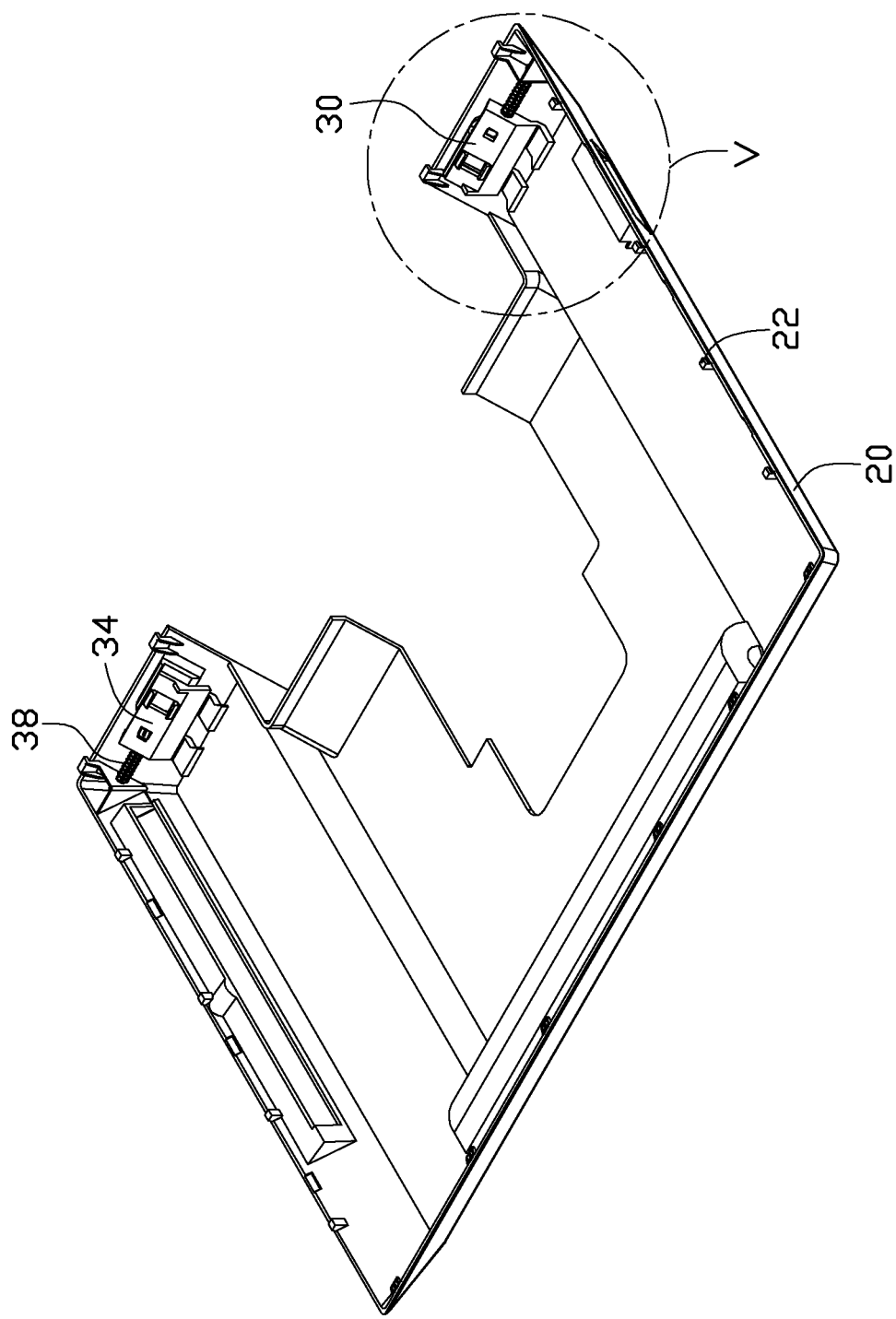
FIG. 4 is an assembled, isometric view of the locking members and the cover of the monitor enclosure in FIG. 3.
Figure 5:
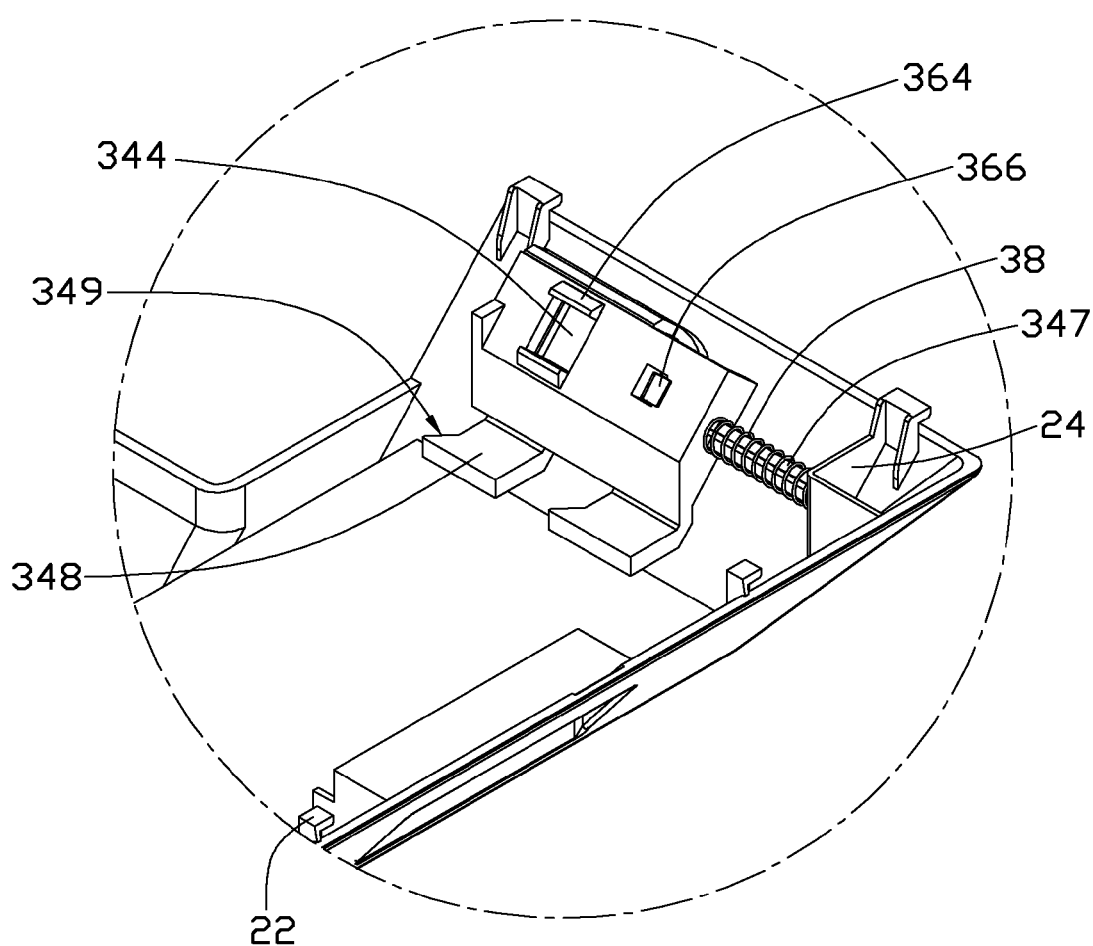
FIG. 5 is an enlarged view of part V in FIG. 4.

Also referring to FIGS. 3-5, each securing portion 34 comprises a substantially rectangular body 342, a connecting bar 347 extending from a lateral side of the body 342, and an engaging section 348 extending from an end of the body 342. A free end of the connecting bar 347 enters into the hole 242 of the corresponding restricting wall 24 of the cover 20. In this embodiment, the engaging sections 348 each comprise two spaced wedge-shaped plates, for engaging with the corresponding baffle of the supporting portion 13 of the base 10. Each plate of the engaging section 348 has a guiding surface 349 at a lateral side thereof inclined to the baffles. A securing opening 344 and a smaller additional securing opening 346 spaced from the securing opening 344 are defined in the body 342.

The operating portions 36 each comprise a flat handle 362, and a pair of first hooks 364 and a smaller second hook 366 extending down from the handle 362. The handle 362 is received in the corresponding concave portion 26 of the cover 20. The first and second hooks 364, 366 extend through the notch 262 of the cover 20 and engage in the securing opening 344 and the additional securing opening 346 of the securing portion 34 respectively, to connect to the securing portion 344 and the operating portion 36.

The flexible member 38 is a spring in this embodiment and mounted on the connecting bar 347 of the securing portion 34. The flexible member 38 has one end securing on the body 342 of the securing portion 34, and an opposite end securing on the restricting wall 24 of the cover 20.

As shown in FIG. 6, the monitor enclosure is in a locked position, and the securing portion 34 in view is pushed by the flexible member 38 due to an elastic deformation thereof. The engaging section 348 of the securing portion 34 engages with the supporting portion 13 of the base 10 and located at front of the supporting portion 13, to restrict the backward movement of the cover 20 relative to the base 10. Additionally, the barbs 22 of the cover 20 embedded in the supporting recesses 12 of the base 10 can restrict the forward and upward movement of the cover 20 relative to the base 10. Thus, the cover 20 is restricted to move only in desired directions and secured on the base 10.

Figure 7:
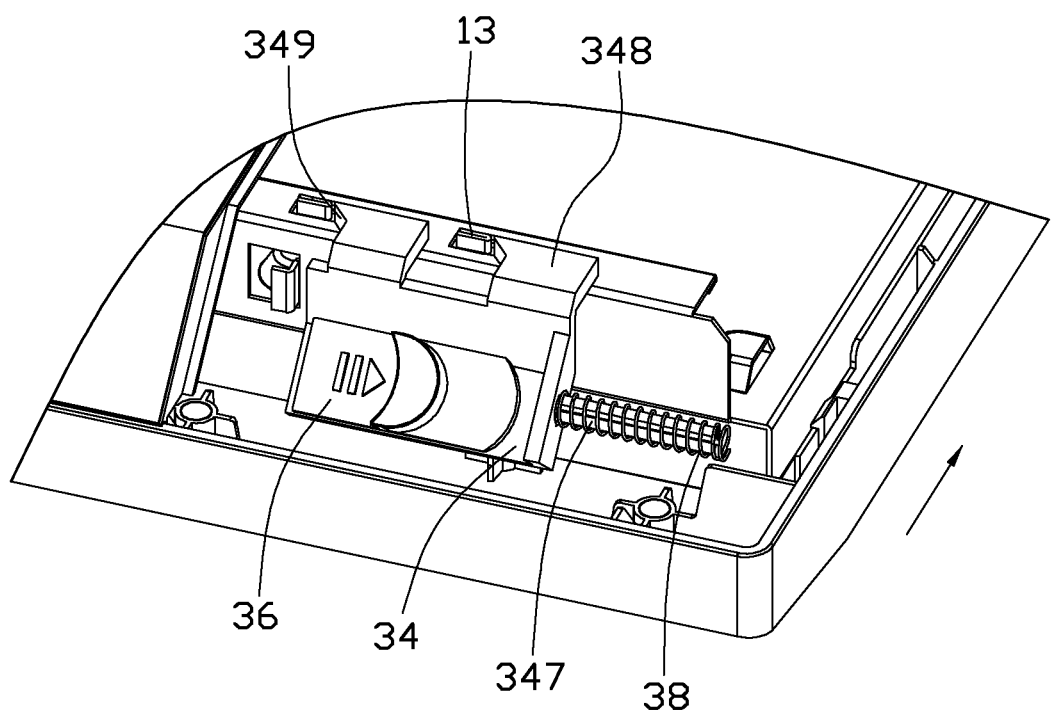
FIG. 7 is an isometric view of the monitor enclosure with the locking member in an unlocked position, wherein the cover has been removed for clarity.

Referring to FIG. 7, to unlock the cover 20 from the base 10, the operating portion 36 of the locking member 30 is manipulated to move toward the restricting wall 24 along the direction shown by the arrow on the operating portion 36, until the engaging section 348 of the securing portion 34 is disengaged from the supporting portion 13 of the base 10;

then, the cover 20 can be moved horizontally and backwardly along the direction of the arrow shown in FIG. 7. After the barbs 22 of the cover 20 are disengaged from the supporting recesses 12 of the base 10, the disengagement of the cover 20 and the base 10 is completed. The engagement of the cover 20 and the base 10 is done by following the above steps in reverse, therefore a detail description thereof is omitted. It is noted that, there is no need to handle the operating portions 36 and only to push the cover 20 forwards to make the engaging sections 348 pass the supporting portions 13 in the process of the engagement of the cover 20 and the base 10 because of the guidance of the guiding surfaces 349 of the engaging sections 348.

It is to be understood, however, that even though numerous characteristics and advantages of the present embodiments have been set forth in the foregoing description, together with details of the configurations and functions of the embodiments, the disclosure is illustrative only, and changes may be made in detail, especially in matters of shape, size, and arrangement of parts within the principles of the embodiments to the full extent indicated by the broad general meaning of the terms in which the appended claims are expressed.

The invention claimed is:

1. A locking assembly for an enclosure having a base and a cover mounted on the base, the locking assembly comprising:
   a plurality of supporting recesses and a pair of supporting portions formed in the base;
   a plurality of barbs formed on a bottom of the cover being received in the supporting recesses of the base when the cover is placed over the base and engaging the supporting recesses when the cover is slidably moved along the base; and
   a pair of locking members each comprising a securing portion movably assembled on the bottom of the cover, an operating portion mounted on a top of the cover and extending through the cover and connected to the securing portion, and a flexible member abutting against both the securing portion and the cover, wherein the securing portion is operable to engage with a corresponding one of the supporting portions to secure the cover on the base, and the securing portion is also operable to disengage from the supporting portion by being moved relative to the cover to remove the cover from the base;
   wherein the securing portion comprises a body defining a main securing opening and a smaller additional securing opening spaced from the main securing opening; and
   wherein the operating portion comprises a handle, a first hook and a second hook smaller than the first hook, the first hook and the second hook extending downward from the handle, the first hook being engaged in the main securing opening of the body and the second hook being engaged in the additional securing opening of the body to connect the securing portion with the operating portion.

2. The locking assembly of claim 1, wherein the securing portion further comprises an engaging section extending from an end of the body and engaging with the supporting portion.

3. The locking assembly of claim 2, wherein the engaging section comprises a wedge-shaped plate, and the supporting portion comprises a baffle engaging with the wedge-shaped plate.

4. The locking assembly of claim 2, wherein the securing portion further comprises a connecting bar extending from a lateral side of the body, and the flexible member is mounted on the connecting bar and abuts against the body and the cover.

5. An enclosure, comprising:
   a base with a plurality of supporting recesses defined therein and a supporting portion formed thereon;
   a cover mounted on the base, the cover comprising a plurality of barbs being received in the supporting recesses of the base when the cover is placed over the base and engaging the supporting recesses when the cover is slidably moved along the base; and
   a locking member comprising a securing portion movably assembled on a bottom of the cover, an operating portion mounted on a top of the cover and extending through the cover and connected to the securing portion, and a flexible member abutting against both the securing portion and the cover, wherein the securing portion is operable to be pushed by the flexible member to engage with the supporting portion to secure the cover on the base, and the securing portion is also operable to disengage from the supporting portion by being moved relative to the cover to remove the cover from the base;
   wherein the securing portion comprises a body defining a main securing opening and a smaller additional securing opening spaced from the main securing opening; and
   wherein the operating portion comprises a handle, a first hook and a second hook smaller than the first hook, the first hook and the second hook extending downward from the handle, the first hook being engaged in the main securing opening of the body and the second hook being engaged in the additional securing opening of the body to connect the securing portion with the operating portion.

6. The enclosure of claim 5, wherein the securing portion further comprises an engaging section extending from an end of the body and engaged with the supporting portion.

7. The enclosure of claim 6, wherein the engaging section comprises a wedge-shaped plate, and the supporting portion comprises a baffle to engage with the wedge-shaped plate.

8. The enclosure of claim 7, wherein the wedge-shaped plate has a guiding surface inclined to the baffle of the supporting portion.

9. The enclosure of claim 6, wherein the securing portion further comprises a connecting bar extending from a lateral side of the body, and the flexible member is mounted on the connecting bar and abuts against the body and the cover.

10. The enclosure of claim 9, wherein a restricting wall is formed at the bottom of the cover with a hole defined therein for the connecting bar to extend through, and the flexible member abuts against the body and the restricting wall.

11. The enclosure of claim 9, wherein the flexible member is a spring.

12. The enclosure of claim 9, wherein the connecting bar is located more adjacent to the additional securing opening than the main securing opening.

13. The enclosure of claim 5, wherein a concave portion is defined in the cover for receiving the handle, and a notch is defined in the concave portion for the first hook and the second hook of the operating portion to extend through.

14. The enclosure of claim 13, wherein the concave portion of the cover is located between the handle and the securing portion.

* * * * *